United States Patent
Gollapudi et al.

(10) Patent No.: US 7,089,331 B1
(45) Date of Patent: *Aug. 8, 2006

(54) METHOD AND MECHANISM FOR REDUCING CLIENT-SIDE MEMORY FOOTPRINT OF TRANSMITTED DATA

(75) Inventors: Sreenivas Gollapudi, Fremont, CA (US); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/515,674

(22) Filed: Feb. 29, 2000

Related U.S. Application Data

(63) Continuation-in-part of application No. 09/086,753, filed on May 29, 1998, now Pat. No. 6,112,197.

(51) Int. Cl.
*G06F 15/16* (2006.01)

(52) U.S. Cl. .................... 709/247; 709/219

(58) Field of Classification Search .......... 707/2, 707/6, 216, 101; 709/102, 216, 217, 219, 709/203, 247; 711/133; 341/87; 382/244; 718/102

See application file for complete search history.

(56) References Cited

U.S. PATENT DOCUMENTS

| | | | |
|---|---|---|---|
| 4,803,613 A | 2/1989 | Kametani | |
| 4,905,138 A | 2/1990 | Bourne | |
| 5,175,856 A | 12/1992 | Van Dyke et al. | |
| 5,241,648 A | 8/1993 | Cheng | |
| 5,303,149 A * | 4/1994 | Janigian | 707/6 |
| 5,305,389 A * | 4/1994 | Palmer | 382/305 |
| 5,359,724 A | 10/1994 | Earle | |
| 5,408,630 A * | 4/1995 | Moss | 711/112 |
| 5,410,698 A | 4/1995 | Danneels | |
| 5,446,858 A | 8/1995 | Copeland et al. | |
| 5,499,355 A * | 3/1996 | Krishnamohan et al. | 711/137 |
| 5,600,316 A * | 2/1997 | Moll | 341/87 |
| 5,632,015 A | 5/1997 | Zimowski et al. | |
| 5,724,588 A | 3/1998 | Hill et al. | |
| 5,754,771 A | 5/1998 | Epperson et al. | |
| 5,765,159 A | 6/1998 | Srinivadsan | |
| 5,787,461 A | 7/1998 | Stephens | |
| 5,794,228 A | 8/1998 | French et al. | |
| 5,797,001 A | 8/1998 | Augenbraun et al. | |
| 5,799,302 A * | 8/1998 | Johnson et al. | 707/7 |
| 5,802,528 A * | 9/1998 | Oki et al. | 707/201 |
| 5,802,569 A | 9/1998 | Genduso et al. | |
| 5,812,527 A | 9/1998 | Kline et al. | |
| 5,812,852 A | 9/1998 | Poulsen | |
| 5,813,000 A * | 9/1998 | Furlani | 707/3 |

(Continued)

OTHER PUBLICATIONS

Padmanabhan et al., Using Predictive Prefetching to Improve World Wide Web Latency, 1996, pp. 1-15.*

(Continued)

*Primary Examiner*—Larry D. Donaghue
(74) *Attorney, Agent, or Firm*—Bingham McCutchen LLP

(57) ABSTRACT

The present invention is directed to a method and mechanism for reducing the expense of data transmissions between a client and a server. According to an aspect of data prefetching is utilized to predictably retrieve information between the client and server. Another aspect pertains to data redundancy management for reducing the expense of transmitting and storing redundant data between the client and server. Another aspect relates to moved data structures for tracking and managing data at a client in conjunction with data redundancy management.

23 Claims, 5 Drawing Sheets

U.S. PATENT DOCUMENTS

| | | | |
|---|---|---|---|
| 5,815,718 A | 9/1998 | Tock | |
| 5,819,268 A * | 10/1998 | Hackett | 707/6 |
| 5,822,749 A * | 10/1998 | Agarwal | 707/2 |
| 5,822,790 A * | 10/1998 | Mehrotra | 712/207 |
| 5,826,253 A | 10/1998 | Bredenberg | |
| 5,832,231 A | 11/1998 | Raman et al. | |
| 5,835,904 A | 11/1998 | Vicik et al. | |
| 5,913,208 A * | 6/1999 | Brown et al. | 707/3 |
| 5,930,795 A | 7/1999 | Chen et al. | |
| 5,937,415 A | 8/1999 | Sheffield | |
| 5,937,421 A | 8/1999 | Petrov et al. | |
| 5,958,040 A * | 9/1999 | Jouppi | 712/207 |
| 6,009,265 A | 12/1999 | Huang et al. | |
| 6,052,699 A | 4/2000 | Huelsbergen | |
| 6,098,064 A * | 8/2000 | Pirolli et al. | 707/2 |
| 6,112,197 A * | 8/2000 | Chatterjee et al. | 707/3 |
| 6,112,209 A | 8/2000 | Gusack | |
| 6,151,602 A | 11/2000 | Hejlsberg et al. | |
| 6,178,461 B1 * | 1/2001 | Chan et al. | 709/247 |
| 6,341,288 B1 * | 1/2002 | Yach et al. | 707/103 R |
| 6,401,193 B1 * | 6/2002 | Afsar et al. | 712/207 |
| 6,421,342 B1 | 7/2002 | Schwartz | |
| 6,421,715 B1 | 7/2002 | Chatterjee et al. | |
| 6,463,508 B1 * | 10/2002 | Wolf et al. | 711/133 |
| 6,484,179 B1 * | 11/2002 | Roccaforte | 707/102 |
| 6,505,187 B1 | 1/2003 | Shatdal | |
| 6,507,834 B1 | 1/2003 | Kabra et al. | |
| 6,513,108 B1 | 1/2003 | Kerr et al. | |
| 6,557,079 B1 * | 4/2003 | Mason, Jr. et al. | 711/137 |
| 6,598,037 B1 | 7/2003 | Craig et al. | |
| 6,662,218 B1 * | 12/2003 | Mighdoll et al. | 709/219 |
| 6,675,195 B1 * | 1/2004 | Chatterjee et al. | 709/203 |
| 6,701,520 B1 | 3/2004 | Santosuosso | |
| 6,763,382 B1 | 7/2004 | Balakrishnan et al. | |
| 2001/0003823 A1 | 6/2001 | Mighdoll et al. | |
| 2001/0013045 A1 * | 8/2001 | Loschky et al. | 707/530 |
| 2001/0051956 A1 | 12/2001 | Bird | |
| 2002/0099806 A1 * | 7/2002 | Balsamo et al. | 709/223 |
| 2002/0143728 A1 | 10/2002 | Cotner et al. | |
| 2002/0194174 A1 * | 12/2002 | Calkins et al. | 707/6 |

OTHER PUBLICATIONS

IBM: "SQL Reference" IBM Db2 Database Version 7.: Online information (aka Universal Database Version 7) 2 pgs.

* cited by examiner

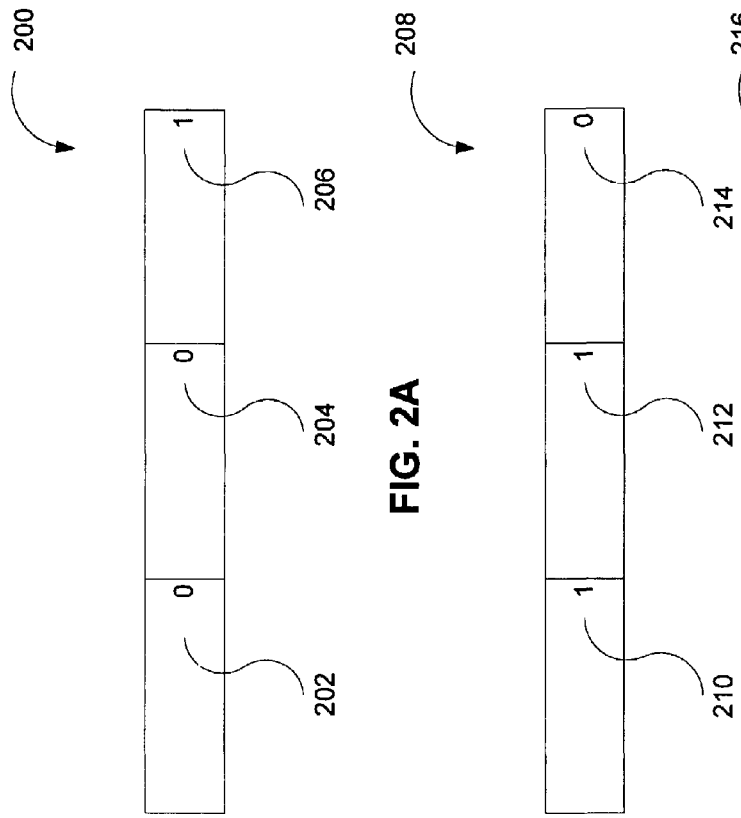
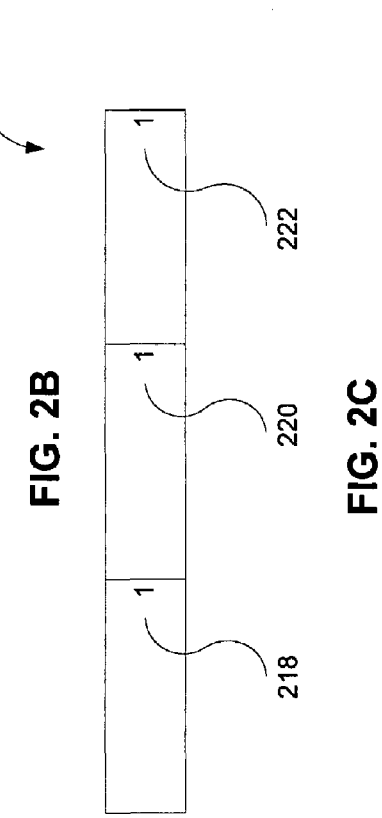
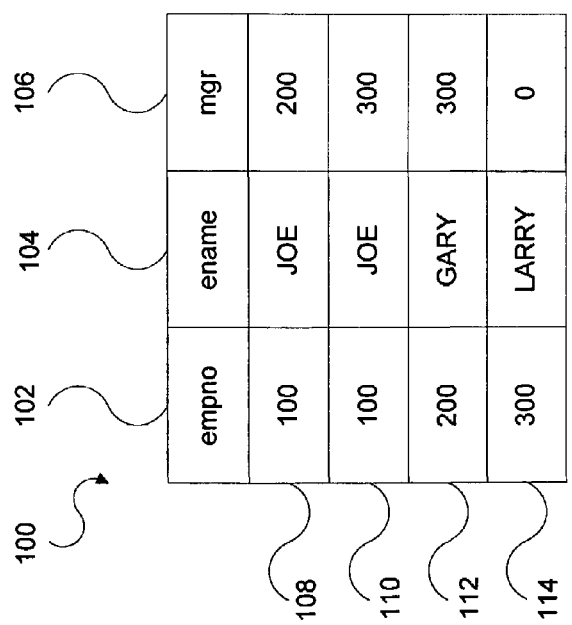

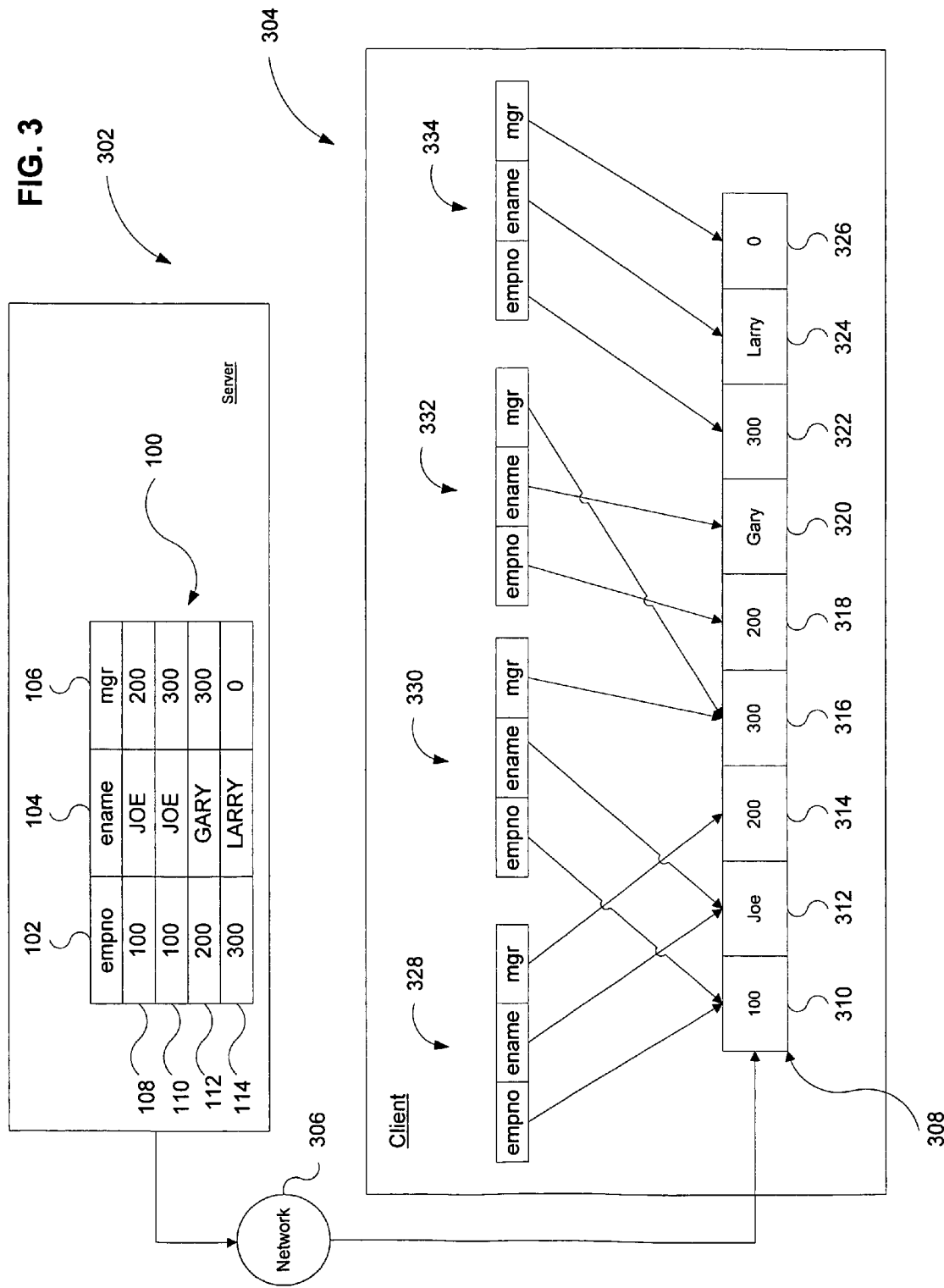

US 7,089,331 B1

METHOD AND MECHANISM FOR REDUCING CLIENT-SIDE MEMORY FOOTPRINT OF TRANSMITTED DATA

RELATED APPLICATION DATA

This application is a continuation-in-part of U.S. patent application Ser. No. 09/086,753, filed on May 29, 1998, and issued as U.S. Pat. No. 6,112,197, the entire disclosure of which is incorporated by reference herein.

BACKGROUND OF THE INVENTION

1. Field of the Invention

The invention relates to computer systems, and more particularly to a method and mechanism for reducing the memory footprint of transmitted data to a client station.

2. Background

Many computer systems utilize servers, such as "database servers", to store and maintain information. In a client-server computer system model (or a multi-tiered computer architecture), users that wish to access or modify information at the server are often located at a "client". To facilitate the explanation of the invention, the terms "database server" and "database client" may be used in this document in place of "server" and "client"; however, the invention is not limited in its applicability to database systems, and indeed, can be utilized in many other types of computer systems.

In client-server systems, users at a database client submit commands to the database server to store, modify, or retrieve data. In response to the user commands, data manipulation or query activities are performed at the database server, with data results returned back to the database client for access. In networked environments, the database server often performs data manipulation or query commands submitted by remotely located clients. The client may establish a direct connection to the database server over the network, or may establish a connection through one or more intervening system components, such as an application server or transaction processing monitor. In either case, the database server processes the user commands and generates appropriate data outputs to be returned to the client. For example, a common database function is to perform data queries using a database query language such as SQL. The database server receives each query and generates a query result that satisfies the criteria defined by a particular query. The query result is subsequently transferred to the database client from which the query originated.

Inefficiencies may occur during the processing and transmission of data between the database server and client. For example, the database server produces a result set composed of a quantity of data that can be sent to a database client. The user may initially place an explicit request to transmit a first portion of that result set from the database server to the client, causing a first set of overhead, such as "network roundtrip overhead", to be expended. At a later time, the user may request a second portion of the result set to be transmitted to the client, resulting in another set of overhead to be expended. This process may proceed until all of the result set is sent, resulting in multiple sets of roundtrip overhead to be expended between the database server and the client. The expense of sending the data in response to multiple requests also includes the wait time that is expended while the user waits for the request to be sent to the database server and for the subsequent data to be sent back to the client. In addition, if the transmitted data are broken into smaller pieces than the optimum data transfer sizes for the system, additional overhead is expended. Thus, the more pieces that the data set is broken into before transmissions from the server to the client, the greater the overhead that is likely to be expended.

Another type of inefficiency that may occur is the retransmission of data in the returned result set. If the data to be sent to the client contains redundancies, then excess overhead, such as increased transmission time and data storage at the client, is expended by the system to transmit and store that redundant data. When the amount of data redundancies is sufficiently large, the excess overhead can have a serious effect upon system performance. Such a circumstance may occur, for example, if the client is querying large database tables with sparse data for performing queries with joins involving wide tables.

As is evident from the foregoing, inefficiencies may occur as a result of data transmissions between a database server and a client. These same inefficiencies may arise from other types of client-server applications, such as for example, a web-based architecture for sending web pages from a web server to a client station having a web browser.

SUMMARY OF THE INVENTION

The present invention is directed to a method and mechanism for reducing the expense of data transmissions between a client and a server. According to an aspect of the invention, data prefetching is utilized to predictably retrieve information between the client and server. Another aspect pertains to data redundancy management for reducing the expense of transmitting and storing redundant data between the client and server. Another aspect relates to novel data structures for tracking and managing data at a client in conjunction with data redundancy management.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 1 depicts a sample database comprising data to be sent between server and client.

FIGS. 2A–2C illustrate bitmaps having change bits for the table depicted in FIG. 1.

FIG. 3 illustrates data structures utilized in an embodiment of the invention.

DETAILED DESCRIPTION

Figure 4:
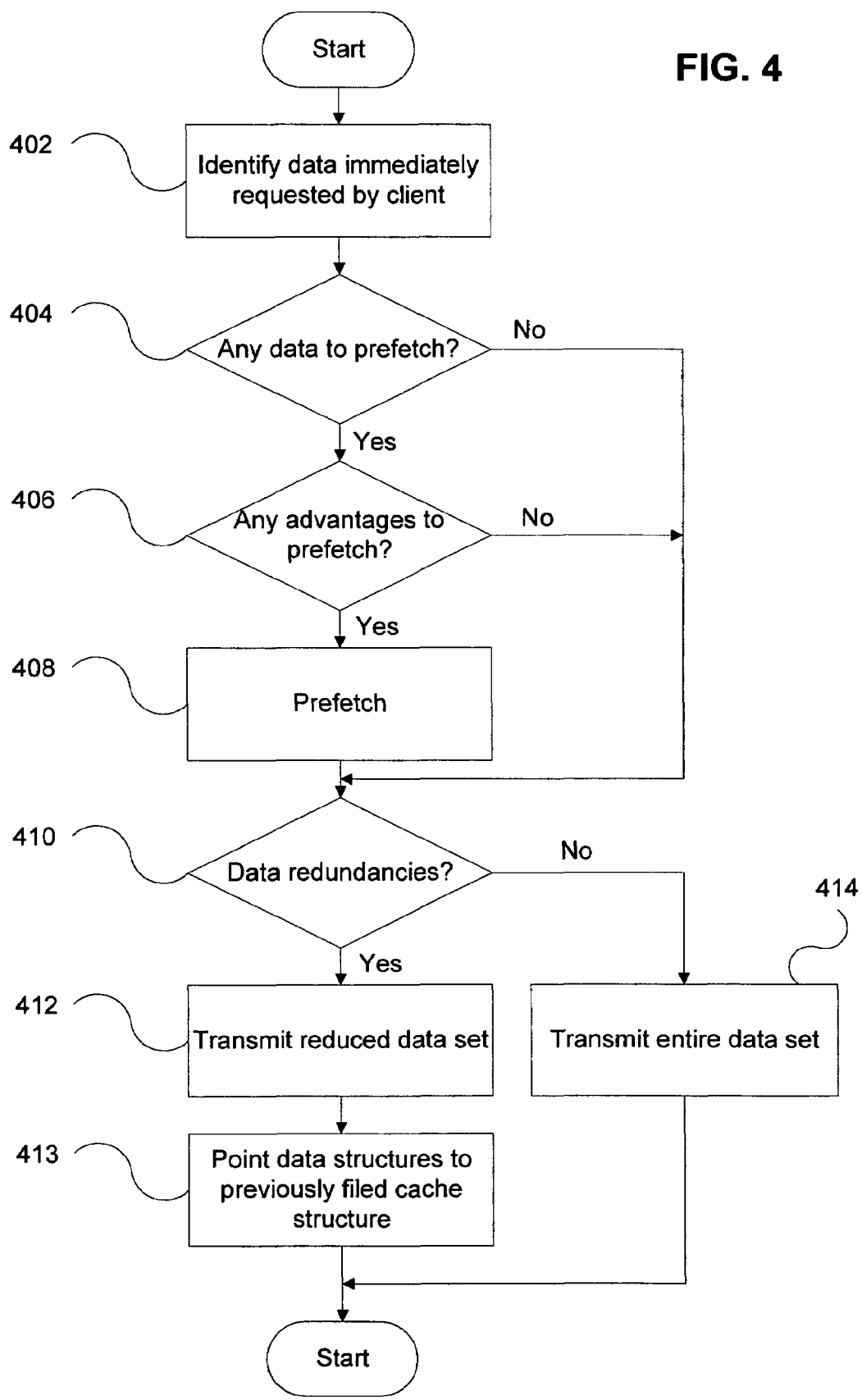
FIG. 4 depicts a process flow for an embodiment of the invention.

The present invention is directed to a method and mechanism for increasing the efficiency of data transfers between a server and a client. In the following description, for the purposes of explanation, one or more embodiments having specific combinations of elements and/or process actions are set forth in order to provide a thorough understanding of the present invention. It will be apparent, however, to one skilled in the art that the present invention may be practices without these specific combinations or order of elements/process actions.

According to an embodiment of the present invention, data access and transmissions between a server and client are performed using a combination of "prefetching" and data redundancy management. Prefetching is employed to predictively retrieve information before it is explicitly requested by a client. Data redundancy management is employed to minimize the overhead of storing redundant information at the client. According to an aspect of the present invention, this inventive combination works to significantly reduce the expense and overhead of retrieving and storing information at a client.

Prefetching refers to the action of transmitting information before it is immediately requested, based upon predictive selection of data anticipated to be requested by a client in the future. To illustrate the invention, consider a data result set at a server as shown in table 100 of FIG. 1. Table 100 includes four rows of data 108, 110, 112, and 114. Initially, the client may only request a portion of table 100 to be sent from the server. This may occur, for example, in systems configured to conserve network bandwidth by allowing the request and transmission of only enough information to be sent that can fit onto a client's display device, page, window, or screen at a particular instant in time. In these systems, additional portions of the requested data are retrieved only if specifically requested, e.g., based upon the user scrolling or paging forward through the displayed data.

The initial request for data results in a certain amount of overhead, including a given quantity of network roundtrips for the user request from the client to server, as well as the data transmission from server to client. At a later time, the user may request a second portion of the result set to be transmitted from the server to client, resulting in further overhead being expended. This process is inefficient if the overhead of separately requesting and sending the data in multiple portions is higher than if the data is requested and sent at one time.

Using the prefetching process of the present invention, it can be predictively anticipated that the client will eventually require more data than is initially requested. In the case of FIG. 1, it can be anticipated that the entire data of table 100 will be requested by a client, whether or not only a first portion of table 100 can fit onto a display screen. Thus, additional portions of table 100, or even the entire table, are prefetched into a client-side cache, even if only a first portion is explicitly requested. When the rest of the table 100 is explicitly requested by the user, rather than sending another request to the server, the data can be efficiently retrieved from the client's local cache.

For an example in another context, consider an Internet web page having hyperlinks to other web pages/information. If a user requests the Internet web page to be sent to the client, it can be anticipated that the user may later wish to retrieve the additional web pages/information that are linked into the initial web page. With the present invention, the contents of the linked web pages/information can be prefetched into the client's local cache. If the user later requests that information, it can immediately be displayed to the user, without requiring any wait time or additional network overhead to request and retrieve that information. An example of a mechanism and process for prefetching data from a remote server that can be used in the present invention is disclosed in U.S. patent application Ser. No. 08/873,644, filed on Jun. 11, 1997, which is hereby incorporated by reference in its entirety.

It is possible that some data previously sent and stored at the client will be the subject of a later request seeking re-transmission of the same data to the client. Such transmission of redundant data causes excess overhead to be expended both in terms of the transmission overhead (e.g., excess bandwidth usage) as well as the excess memory cache used at the client to store the redundant data. The present invention provides a novel method and mechanism to control the transmission and storage of redundant data, which can also be used advantageously in combination with prefetching.

According to an embodiment of the invention, only data that is changed from one row to the next is transmitted from the server to the client. Referring to FIGS. 2A, 2B, and 2C, shown are bitmaps that can be used in an embodiment of the invention to map changes from one row to the next. Each bitmap corresponds to a transition from a first row to a second row in table 100. Thus, bitmap 200 of FIG. 2A corresponds to the transition from row 108 to row 110 in table 100, bitmap 208 of FIG. 2B corresponds to the transition from row 110 to row 112, and bitmap 216 of FIG. 2C corresponds to the transition from row 112 to row 114.

In the bitmaps of FIGS. 2A, 2B, and 2C, each bit represents a transition from one column value of a first row to that same column value in the next row. A "0" bit represents no change of value from one row to the next, while a "1" bit represents a change of value. Referring to FIG. 2A, bitmap 200 corresponds to the transition from row 108 to 110 in table 100, as stated above. Bit 202 of bitmap 200 corresponds to the transition from row 108 to row 110 in column 102. Since there is no change of value from row 108 to row 100 in column 102 (i.e., the column value stayed the same), bit 202 is set at "0". Similarly, the column value of column 104 did not change from row 108 to row 110. As a result, the corresponding bit 204 in bitmap 200 is set at "0". However, bit 206 in bitmap 200 is set to "1", since its corresponding transition from row 108 to row 110 in column 106 has a change in value from "200" to "300".

In a similar manner, it can be seen that bits 210, 212, and 214 of bitmap 208 are set at "1", "1", and "0", respectively, corresponding to changes/no changes in value between rows 110 to 112 in table 100. Likewise, bits 218, 220, and 222 in bitmap 216 are set at "1", "1", and "1", respectively, corresponding to changes in value between rows 112 and 114 in table 100.

To reduce the transmission of redundant data in table 100 from server to client, table 100 is checked to determine whether redundant data between one row and the next is being requested. Bitmaps 200, 208, and 216 can be checked to make this determination. Only data that changes from one row to the next will be sent from server to client. As noted above, changed data corresponds to the value of "1" for each bit in the bitmaps 200, 208, and 216.

FIG. 3 illustrates data structures at a client 304 that can be used to store and track the data that is sent from a server 302 to the client 304. For the convenience of the reader, database table 100 is reprinted and shown as the database table being sent from server 302 to client 304. Cache 308 represents the memory cache at client 304 that stores data sent from server 302.

In operation, a portion of table 100 from server 302 is explicitly requested for delivery to client 304. If prefetching is used, then a greater portion, or even all, of table 100 is sent in response to the user/client request. For purposes of this example, it is assumed that the entirety of table 100 is prefetched to client 304. Initially, all of row 108 would be sent from server 302 to client 304 over network 306. Thus, the values "100", "Joe", and "200" corresponding to columns 102, 104, and 106 of row 108 would be sent to client 304, and stored in cache sections 310, 312, and 314, respectively.

At client 304, data structures are maintained to allow a user to access the data that is received. In an embodiment, the data structures correspond to the types of data that are transmitted from server to client. Thus, data structure 328, corresponding to row 108 of table 100, contains pointers to each of the column values for row 108 in table 100. In particular, the pointers in data structure 328 point to cache sections 310, 312, and 314 of cache 308, which correspond to the local copy of row 108, and these pointers are used by a usr at client 304 to access these cached values.

Additional data structures are employed to track each row of data that is transmitted form server 302 to client 304. Thus, data structure 330 contains pointers to the cache sections containing values for row 110 of table 100. Similarly, data structures 332 and 334 contain pointers to the cache sections containing values for rows 112 and 114, respectively, of table 100 sent from server 302 to client 304.

After the first row 108 of table 100 is sent from server 302 to client 304, any transmission of additional rows results in the possibility that redundant data for column values will be requested for transmission across network 306. Thus bitmaps 200, 208, and 216 are consulted in an embodiment of the invention to determine whether a next-row redundant data value is being sent. If a next-row redundant data value situation occurs, then the redundant data value is not sent across network 306. Instead, the corresponding data structure at client 304 is configured to point to the previous copy that has already been transmitted.

Consider the values of row 110 in table 100. A review of rows 108 and 110 in column 102 of table 100 shows that there is no change in the column value. A similar review of these rows in column 104 shows that there is again no change in value. However, inspection of rows 108 and 110 in column 106 shows that the column value changes from "200" to "300". In this circumstance, only the changed column value (i.e., "300" in row 110, column 106 of table 100) is sent from server 302 to client 304. This changed column value is stored in cache section 316 of cache 308.

The data structure 330 for row 110 is configured to point to cache section 316 for its representation of column 106. However, for the unchanged column values that did not get transmitted from server 302 to client 304, data structure 330 is configured to point to existing cache sections that contain the redundant data. Thus, the pointer in data structure 330 corresponding to column 102 points to cache section 310 (which is also pointed to by the data structure pointer 328 corresponding to column 102 for row 108 of table 100). The pointer in data structure 330 corresponding to column 104 points to cache section 314 (which is also pointed to by the data structure pointer 328 corresponding to column 104 for row 108).

In an equivalent manner, it can be seen that only the values for columns 102 and 104 in row 112 differ from it preceding row 110. The column value for row 112 did not change in the transition from row 110 to 112. Thus, only the values for columns 102 and 104 in row 112 are transmitted from server 302 to client 304. These transmitted values are stored in cache sections 318 and 320. In the data structure 332 for row 112, it can be seen that pointers for columns 102 and 104 point to these newly filled cache sections, but the pointer for column 106 points to a cache section 316 previously filled for row 110.

For row 114, it can be seen that every column has a value that differs from its value in the preceding row. Thus, every column value is transmitted from server 302 to client 304, which is then stored in cache 308. Thus, cache section 322, 324, and 326 are used to store the values of row 144 transmitted to client 304. Data structure 334, which corresponds to row 114 in table 100, contains pointers that point to each of these newly filled cache sections.

While the embodiment just discussed only performs a data redundancy check for one preceding row, the invention can be extended to check or data redundancy across multiple previous rows. The data structures maintained form each row can point to any cache section in cache 308, even for cache sections filled by row values beyond just the immediately preceding row.

To track changes across multiple rows, a multidimensional bitmap can be maintained to track changes across multiple rows. Thus, the bitmap would contain multiple bits for each column-row pair, corresponding to an indication of value change for several preceding rows for that same column.

Instead of, or in addition to the use of a multidimensional bitmap, an additional optimization comprises a scan of cache 308 to eliminate redundant data storage, without the use of bitmaps to reduce the transmission of data redundancies. In this optimization, the redundant data in cache 308 are removed after they have been transmitted from server 302 to client 304 (which reduces cache usage at the client), and pointers in the data structures are reorganized to all point to the reduced and consolidated number of column values.

FIG. 4 depicts an embodiment of a process flow that can be used to combine prefetching and data redundancy management to control data transmissions between a server 302 and client 304. Initially, the data that is immediately being requested by a client 304 is identified (402). Based upon the immediately requested data, a determination is made whether there exists any identifiable data to be prefetched to the client (404). This determination is made in a predictive manner based upon several factors. Such factors could include, for example, any data compression ratio that are being used or established. If the ratio is too small, data redundancy management can be turned off.

If such data is identified, a determination is then made whether it is advantageous to perform compression data redundancy management or prefetch the identified data (406). Some types of data can be identified as being very likely to be requested in the immediate future by the client, and these types of data render it more likely of an advantage to prefetch. For example, if a client requests only a first portion of a result set or database table result, then the remaining data in the result set/database table set is very likely to be needed by the client. The cost of sending the identified data immediately and the likelihood of the client actually requesting the identified data can be considered in light of the additional overhead to be expended if the client makes the additional requests later to determine whether prefetching would be advantageous. If it is advantageous to prefetch, then prefetching is employed to send the additional data to the client (408). In an alternative embodiment, prefetching can be performed as an "on" or "off" option. When prefetching is turned on, the above-described process for determining advantages to prefetching need not be performed.

Before the identified prefetched data is sent to client 304, a determination is made whether there exists redundant data to be sent (410). For example, bitmap records can be reviewed to detect column-to-column changes/no changes in database row values. If data redundancies exist, then a reduced data set is sent from the server to client (412), and their corresponding data structures at client 304 are configured to point to shared cache space for multiple rows (413). If no data redundancies are detected, then the entire data set is transmitted from server 302 to client 304 (414).

To increase accuracy of predicting costs for transmitting prefetched data, the size of data values can be transmitted along with the data values themselves. Thus, the memory cache 308 in FIG. 3 includes additional fields for the size of data values that lend themselves to be described in this manner, e.g., string values. Other methods for reducing the transmission of redundant data may also be employed in the invention in combination with prefetching (e.g., U.S. application Ser. No. 09/086,753, filed on May 29, 1998, which is hereby incorporated by reference in its entirety).

System Architecture Overview

Figure 5:
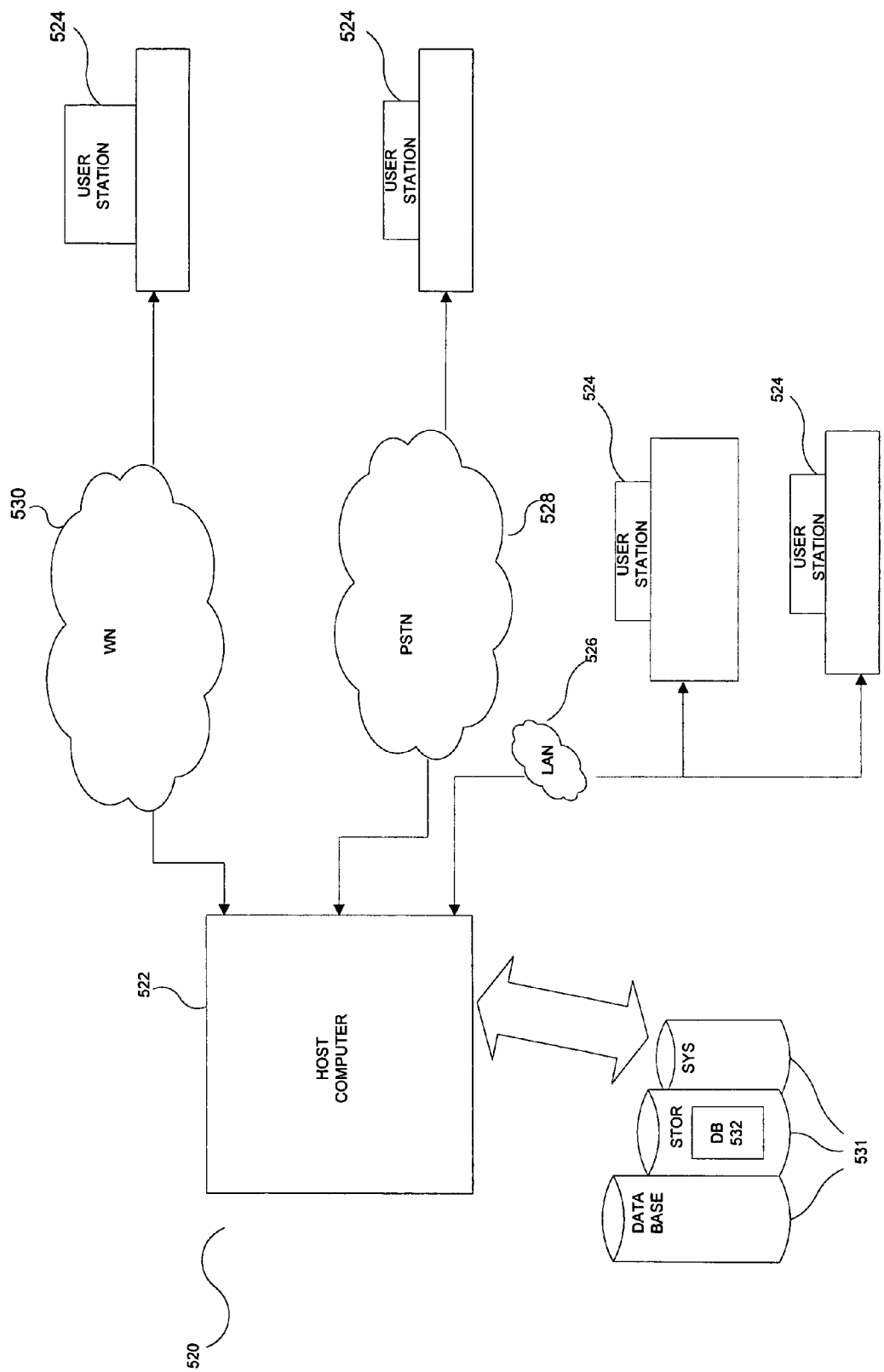
FIG. 5 is a diagram of a computer system with which the present invention can be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522.

In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 522 can access two or more databases 532, stored in a variety of mediums, as previously discussed.

Figure 6:
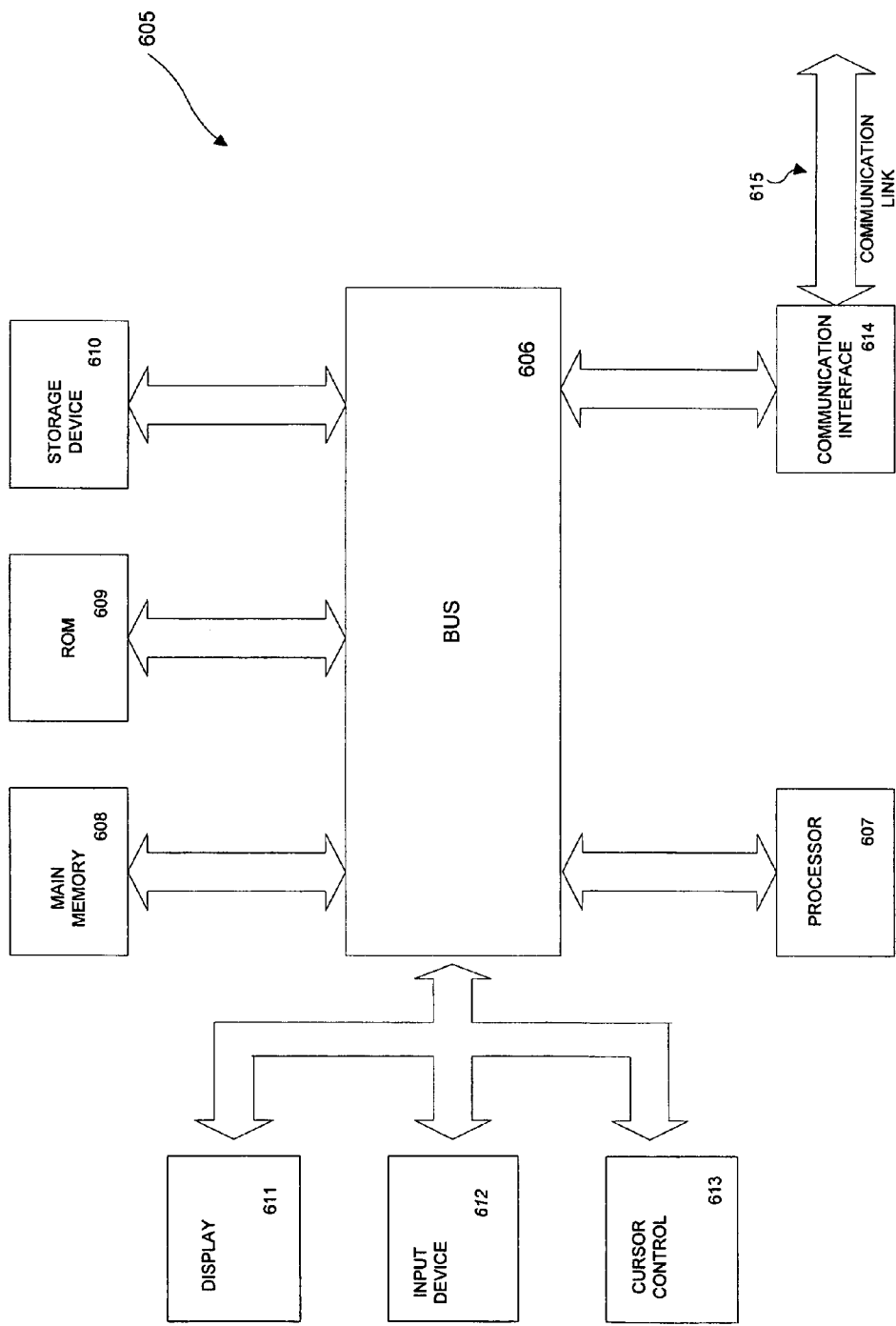
FIG. 6 is an additional diagram of a computer system with which the present invention can be implemented.

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607.

A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other keys, is coupled to the bus 606 for communicating information and command selections to the processor(s) 607. Another type of user input device may include a cursor control 613, such as, but not limited to, a mouse, a trackball, a fingerpad, or cursor direction keys, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information.

Various forms of computer-usable media may be involved in providing one or more sequences of one or more instructions to the processor(s) 607 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 606 may receive the infrared signals and place the instructions therein on the bus 606. The bus 606 may carry the instructions to the main memory 608, from which the processor(s) 607 thereafter retrieves and executes the instructions. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 524 and the host computer 522. The communication interface 614 of a respective processing unit transmits and receives electrical, electromagnetic or optical signals that include data streams representing various types of information, including instructions, messages and data.

A communication link 615 links a respective user station 524 and a host computer 522. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 6*h*15 may be a wireless network 530.

A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A process for increasing the efficiency of data transfers between a client and a server comprising:
   identifying data requested by a client;
   identifying prefetch data, said prefetch data comprising information not immediately requested by said client;
   determining the existence of data redundancies in said prefetch data;
   obtaining a reduced set of prefetch data based at least in part on the determined existence of data redundancies; and
   transmitting the reduced set of prefetch data from the server to the client, said reduced set comprising a smaller memory footprint than said prefetch data;
   wherein the existence of said data redundancies is determined by calculating row differences between successive rows in said prefetch data.

2. The process of claim 1 in which calculating said row differences between successive rows in said prefetch data is performed by identifying identical column values for said successive rows.

3. The process of claim 1 in which determining the existence of said data redundancies in said prefetch data is performed by consulting a bitmap corresponding to changes between a first row and a second row of a database table.

4. The process of claim 3 in which consulting said bitmap is performed by evaluating each bit in said bitmap to determine changes between said first row and said second row.

5. The process of claim 1 in which determining the existence of said data redundancies in said prefetch data is performed by creating a bitmap corresponding to changes between a first row and a second row of a database table, said bitmap containing bit values for differences in column values between said first and said second rows.

6. The process of claim 5 in which said first and said second rows are not consecutive rows of prefetch data.

7. The process of claim 6 in which said bitmap is a multidimensional bitmap.

8. The process of claim 1 in which determining the existence of said data redundancies in said prefetch data is performed by identifying multiple copies of an item of information in said prefetch data; and
   the act of transmitting a reduced set of prefetch data comprises sending a single copy of said item that has not changed between a first row and a second row.

9. The process of claim 8 further comprising:
   maintaining pointers at said client corresponding to said prefetch data;
   pointing multiple ones of said pointers to said single copy in a client cache.

10. A computer program product that includes a medium usable by a processor, the medium having stored thereon a sequence of instructions which, when executed by said processor, causes said processor to execute a process for increasing the efficiency of data transfers between a client and a server, said process comprising:
    identifying data requested by a client;
    identifying prefetch data, said prefetch data comprising information not immediately requested by said client;
    determining the existence of data redundancies in said prefetch data;
    obtaining a reduced set of prefetch data based at least in part on the determined existence of data redundancies; and
    transmitting the reduced set of prefetch data from the server to the client, said reduced set comprising a smaller memory footprint than said prefetch data;
    wherein the existence of said data redundancies is determined by calculating row differences between successive rows in said prefetch data.

11. The computer program product of claim 10 in which calculating said row differences between successive rows in said prefetch data is performed by identifying identical column values for said successive rows.

12. The computer program product of claim 10 in which determining the existence of said data redundancies in said prefetch data is performed by consulting a bitmap corresponding to changes between a first row and a second row of a database table.

13. The computer program product of claim 12 in which consulting said bitmap is performed by evaluating each bit in said bitmap to determine changes between said first row and said second row.

14. The computer program product of claim 10 in which determining the existence of said data redundancies in said prefetch data is performed by creating a bitmap corresponding to changes between a first row and a second row of a database table, said bitmap containing bit values for differences in column values between said first and said second rows.

15. The computer program product of claim 14 in which said first and said second rows are not consecutive rows of prefetch data.

16. The computer program product of claim 15 in which said bitmap is a multidimensional bitmap.

17. The computer program product of claim 10 in which determining the existence of said data redundancies in said prefetch data is performed by identifying multiple copies of an item of information in said prefetch data; and the act of transmitting a reduced set of prefetch data comprises sending a single copy of said item that has not changed between a first row and a second row.

18. The computer program product of claim 17 further comprising:

maintaining pointers at said client corresponding to said prefetch data;

pointing multiple ones of said pointers to said single copy in a client cache.

19. The computer program product of claim 10 in which said prefetch data comprises information in a database table.

20. The computer program product of claim 10 in which said prefetch data comprises information associated with a web page.

21. A general purpose computer system comprising at least one server and at least one client, said general purpose computer system configured to increase the efficiency of data transfers between said client and said server, comprising:

said client configured to send a request for data;

said server located remote to said client and configured for receiving said request generated by said client station by:

identify data responsive to said request;

identify prefetch data, said prefetch data comprising information not immediately requested by said client;

determine the existence of data redundancies in said prefetch data;

obtaining a reduced set of prefetch data based at least in part on the determined existence of data redundancies; and transmit the reduced set of prefetch data from the server to the client, said reduced set comprising a smaller memory footprint than said prefetch data;

wherein said server is configured to determine the existence of said data redundancies by calculating row differences between successive rows in said prefetch data.

22. The computer system of claim 21 in which said server is configured to determine the existence of said data redundancies in said prefetch data by consulting a bitmap corresponding to changes between a first row and a second row of a database table.

23. The computer system of claim 21 in which said server is configured to determine the existence of said data redundancies in said prefetch data by creating a bitmap corresponding to changes between a first row and a second row of a database table, said bitmap containing bit values for differences in column values between said first and said second rows.

* * * * *